UNITED STATES PATENT OFFICE.

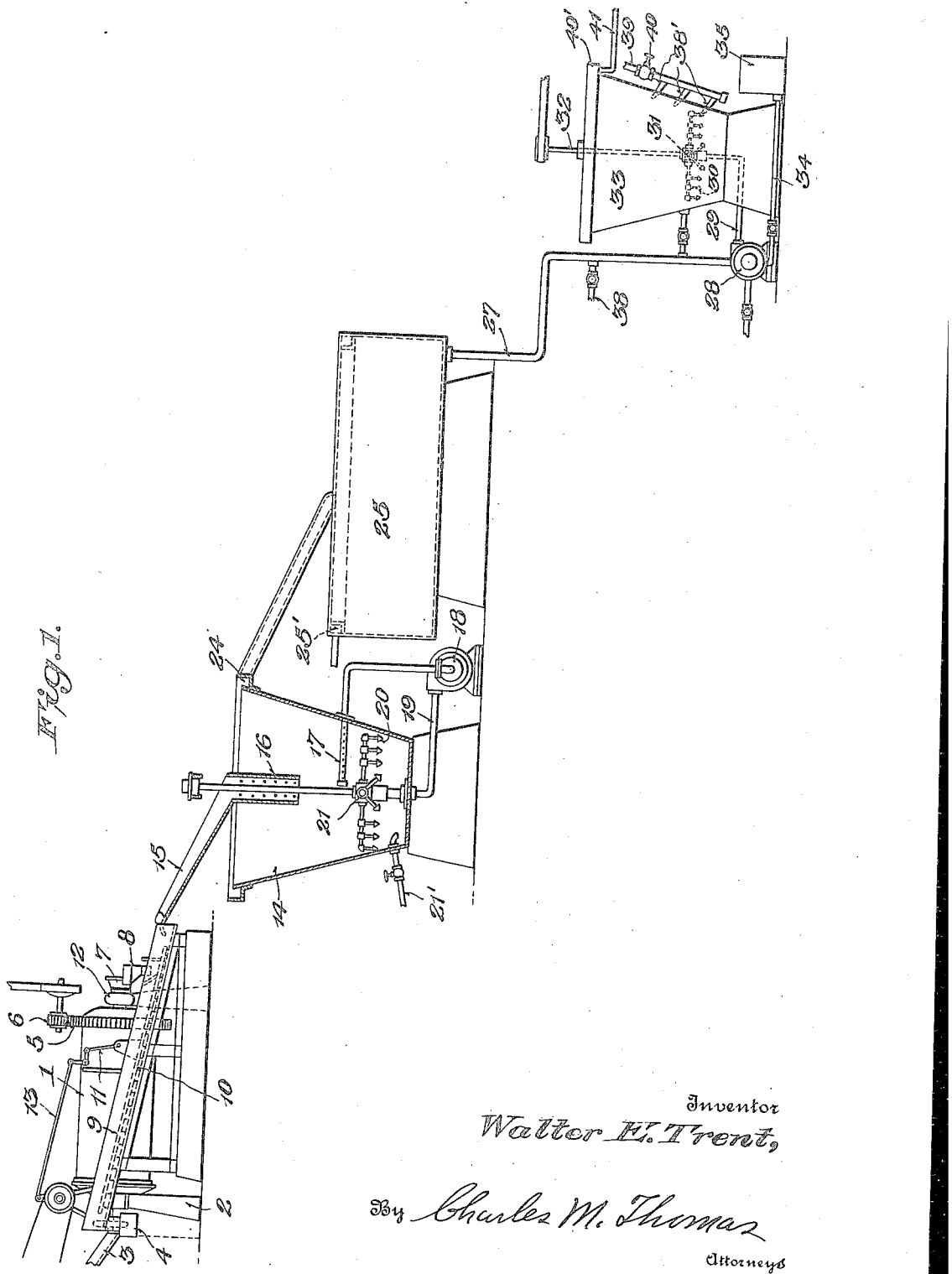

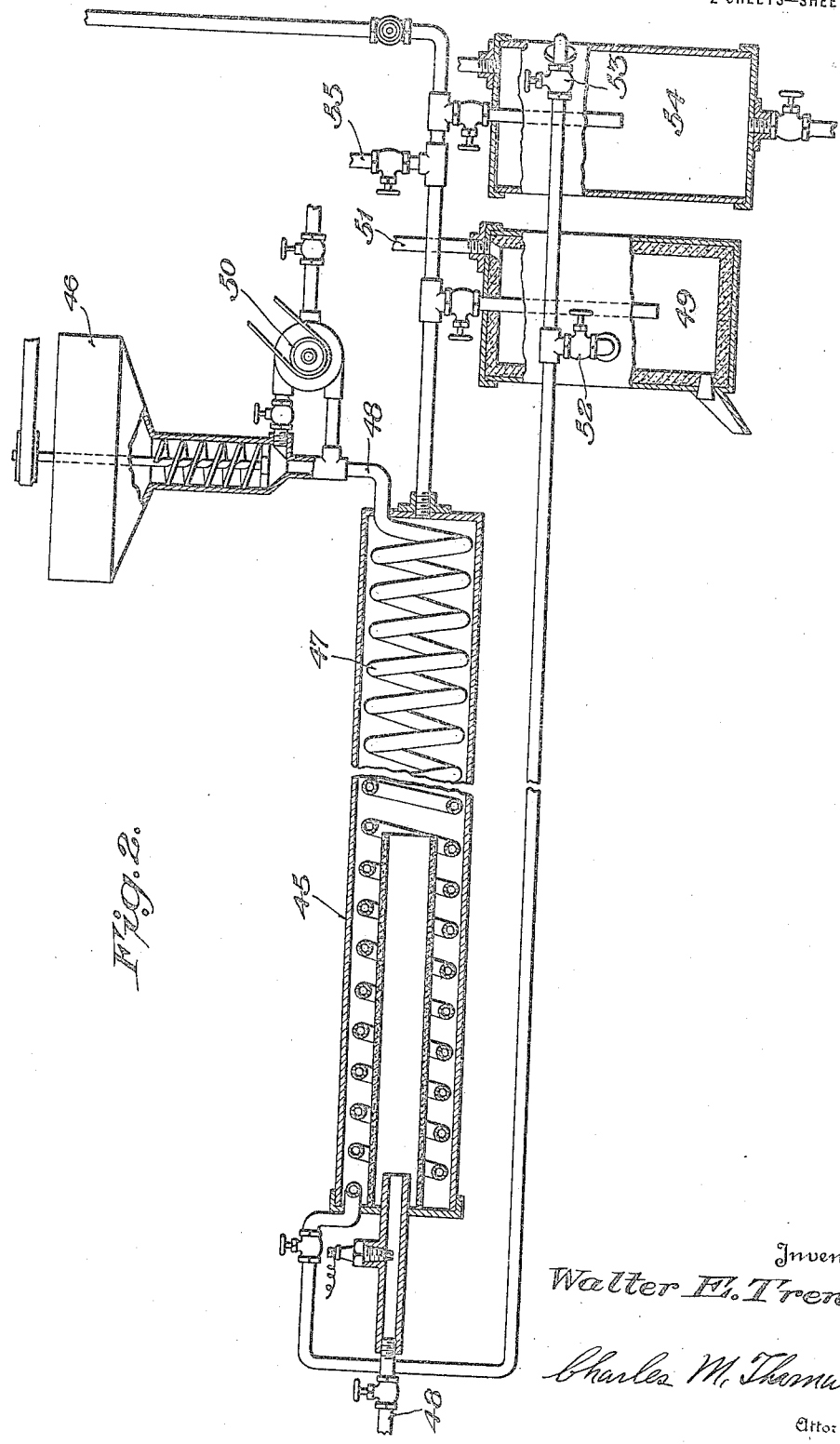

WALTER E. TRENT, OF WASHINGTON, DISTRICT OF COLUMBIA, ASSIGNOR TO TRENT PROCESS CORPORATION, OF WASHINGTON, DISTRICT OF COLUMBIA, A CORPORATION OF DELAWARE.

PROCESS OF PURIFYING MATERIALS.

1,420,165.　　　　Specification of Letters Patent.　Patented June 20, 1922.

Application filed February 25, 1920.　Serial No. 361,230.

*To all whom it may concern:*

Be it known that I, WALTER E. TRENT, a citizen of the United States of America, residing at Washington, in the District of Columbia, have invented certain new and useful Improvements in Processes of Purifying Materials, of which the following is a specification.

The invention relates to the purification of carbonaceous minerals, such as coals, bituminous and anthracite, and other minerals containing carbon or hydrocarbon associated with non-combustible or ash forming materials.

It is an object of the invention to largely eliminate the ash forming content of carbonaceous materials in advance of combustion, and the invention is based upon the discovery that the greater part of this content is not chemically combined, or molecularly intermingled with the carbon, but exists in physically distinct particles capable of detachment and separation.

I am aware that it is common practice to separate from coal, slate and other non-combustible materials associated therewith that are not so fine as to be carried in suspension by water, but the impurities separated by my invention are the above mentioned impurities when in such a fine state of division that they are carried in suspension by the water, and more particularly are that class of impurities intimately commingled with the carbon and generally result from the organic union in the original vegetable matter.

Broadly described, the process which forms the subject matter of the present invention consists, first in freeing from each other carbon and ash forming particles, and second, in effecting a separation thereof. The first step may be accomplished by any suitable method of subdivision of the original mass into sufficiently fine particles. The second step may also be performed by various methods of separation, but I have discovered one method superior to any other known to me at the present time. This per se forms the subject matter of another invention as described in my co-pending application Serial No. 363,797, filed March 6, 1920, but I shall describe it herein as related to the broad process.

As a further development of the process I have devised a method of finely dividing or comminuting the mass of carbonaceous material by other than mechanical means. This per se also forms the subject matter of another invention, but will be referred to herein only in connection with the broad process.

In the accompanying drawings I have diagrammatically disclosed an embodiment of the invention which is only illustrative of many other forms of apparatus capable of supporting the process.

In the drawings Figure 1 represents a diagrammatic view of an apparatus, and

Figure 2 is a view of an apparatus for performing one of the steps of the process.

In carrying out the process the coal or other mineral containing a carbonaceous and a non-carbonaceous content, after being coarsely ground and roughly separated from foreign impurities of the nature of slate free from carbon, stones or the like, is then reduced to a fineness varied according to the nature of the specific material being treated. In some materials particles which will pass through a sixty mesh screen or larger are in condition for separation, while with other materials the reduction must be carried to the extent of two hundred mesh or finer.

The predominating materials now being removed by present day picking and washing processes are slate and bone, most of which have a very considerable carbon content which is recovered by this process at even coarser sizes than those mentioned above.

I preferably effect the grinding wet, which is by far the most expedient and inexpensive manner of finely reducing the materials, the coal being introduced to a tube mill 1 rotatably supported in trunnions 2 from a suitable feed chute 3 leading to a feed trough 4. The drum 1 is provided with feeding cups for conveying the material through the hollow supporting trunnion on the drum to the interior thereof, a supply of water being introduced at this time to the drum. The reducing apparatus herein disclosed may be of the ball or pebble type having a plurality of balls or pebbles therein adapted upon the rotation of the drum by means of the cooperating gears 5 and 6 to finely reduce in the presence of the water the coal introduced thereto.

After undergoing treatment in the tube mill so as to physically detach or liberate particles of ash forming materials which may collect gangue, which is a well known term in the art, from the carbonaceous substances the divided materials suspended in water discharge through the gudgeon 7 into the feed trough 8 leading to a hydraulic classifier 9 which may be of any preferred construction. In the present disclosure the classifier 9 is provided with a reciprocating scraper 10 actuated by means of the link 11 cooperating with a suitable bell crank lever, connected with a driving lever 13 driven from any suitable source of power. When the material is discharged into the hydraulic classifier, the coarser particles are returned by the classifier to the feed trough 4 for a further reduction in the grinding mill, while the finer particles which have been reduced to such a degree of fineness as to liberate ash forming materials from the carbonaceous content are introduced to a separator 14.

The fine particles of material suspended in the water flow through the chute 15 leading from the classifier to the separator 14 which effects a preliminary separation of different substances of the material such as iron, iron sulphides or the like which may be eliminated by hydraulic separation. The suspended particles flow into the hydraulic separator 14 through the sleeve 16 which separator is provided with a perforated pipe 17 leading to a pump 18, from which pump extends a conducting pipe 19 communicating with a series of nozzles 20 which are mounted for rotation by any suitable means. The nozzles 20 of the agitator 21 slowly revolve, the suspended particles of carbonaceous material and non-carbonaceous substances being conveyed through the pump and discharged through the nozzles 20 to assist in depositing the heavier impurities such as iron and the like into the bottom of the tank while the suspended carbonaceous material and other impurities pass off with the water for a further separation. The impurities collected in the hydraulic separator 14 may discharge therefrom through the valve controlled outlet 21' as they accumulate. The carbonaceous materials and other suspended impurities of a lighter nature flowing from the hydraulic separator 14 due to a slight velocity of the water enter the launder 24 to be conveyed to a receiving tank 25. In this tank the flocculent impurities suspended in the water will flow off through the discharge 25' while the particles of carbonaceous material and other impurities such as silica and silicates begin to thicken somewhat in the collecting tank 25, because of the decrease in water velocity.

The material which is still held in suspension is next subjected to a further separation which is effected in the following manner. This material consisting of carbonaceous substances and particles of non-carbonaceous matter is discharged through the feed pipe 27, suspended in water, passing through a pump 28, a feed pipe 29, and a plurality of feeding jets or nozzles 30, carried by an agitator 31, which may be operated by manual or power means 32, and is located within a treating container 33. Into this receptacle is introduced a separating agent, such for instance as gasoline, navy fuel oil, crude oil or the like, the separating agent being preferably introduced through the pump 28 to the container with the suspended materials and is conveyed to the pump from a source of supply 35 connected with the pump by a feed pipe 34. When the treating agent is thus introduced and the suspended material agitated in the container 32 by the rotation of the agitator 30, the hydrocarbon oil or other agent will come in contact with the carbonaceous particles enveloping the same and gradually producing an agglomeration of these particles. The ash forming substances such as the silica and silicates, remain in suspension in the water and as the carbon particles are agglomerated by the treating agent during the agitation thereof both water and suspended impurities or non-carbonaceous particles will be excluded from the carbonaceous mass. The exact nature of this reaction is not at present completely understood, but it may possibly result from the non-miscibility of the water and liquid hydrocarbon, and the greater affinity existing between the liquid hydrocarbon and carbon particles, than that existing between the carbon particles and the water. Regardless of the exact nature of the reaction, the effect produced is a more complete and rapid separation than can be obtained by any other methods of which I am now aware.

The quantity of the treating agent required may vary with different materials, and may also vary according to the nature of the product desired, but I have found that with benzol approximately 1 part thereof by weight to two parts by weight of the carbonaceous content of the dry comminuted material with sufficient agitation will bring about the desired reaction. I have also successfully employed navy fuel oil as a cleaning and separating agent, with which oil about 1 part by weight to two parts by weight of the carbonaceous content of the dry comminuted material at sizes varying from approximately 100 to 200 mesh will produce the reaction. The quantity of ash removed is largely dependent upon the fineness of the material undergoing treatment. If the material is reduced to a very fine mesh the greater part of the ash or gangue is detached from the carbon, and this detached ash is separated by the purifying treatment herein described. By using the amounts mentioned in the above cases, a comparatively soft greasy amalgam is formed, but the treating agents can be used in lesser amounts if it is desired to form a product of a more solid and less oily nature. By the words agglomerate or amalgam, as used in the specification and claims, I mean that the product is of a non-flowing or semi-solid consistency containing principally carbonaceous material and oil with a small percentage of water, which water, however, is not sufficient to cause the mass to be frothy, or of a liquid nature. The mass may be termed a non-aqueous amalgam in the sense that the same is in a semi-solid or plastic state.

The quantity of water or moisture contained in the agglomerated mass may vary, but usually the mass contains from 5 to 10 per cent water. It will also be appreciated that the finer the material is ground before being subjected to treatment, the greater the ash reduction, inasmuch as substantially all of the detached ash is excluded from the carbonaceous material. The amalgamated masses may be small plastic agglomerates, consisting of a multitude of the fine carbon particles and oil, or the carbon particles, and oil may agglomerate in large plastic masses, the size of the amalgam being principally dependent upon the time and violence of agitation. Many other treating agents such as crude oil and the like have also been used by me with success.

When the oil or other treating agent is introduced to the liquid containing the suspended impurities, the agitation of the mass, as before stated, not only serves to agglomerate the carbonaceous content and to exclude the non-carbonaceous material, but also segregates or dispels the water from the agglomerated or collected carbonaceous content. It may be desirable to introduce air with the suspended particles and water, and this may be accomplished by the opening of the air feed pipe 38.

The agitation is maintained in the container 33, or in successive containers, water being preferably added to wash away the suspended impurities until they have been largely eliminated. In the embodiment of the invention herein disclosed water is introduced to the container 33 by water feeding jets 38' fed from a source of supply 39 controlled by a valve 40. When the reaction or agglomeration of the carbon particles by the agglomerating agent has taken place, then water may be introduced to the container 33 serving to wash out many impurities, it being understood that the agglomerated carbonaceous mass will not mix with the water and impurities, but will remain segregated. The over-flowing water with suspended impurities passes into the overflow trough 40' and it is discharged by a discharge pipe 41. The remaining agglomerated mass of carbonaceous material and its treating agent, may be further treated to form a liquid fuel by the addition of suitable oil to thin the mass, or to form a dry powder of the relatively pure carbonaceous material by the removal of the separating agent by distillation, evaporation or otherwise. The material may be removed by lifting it from the open end of the container, or a suitable discharge in the container may be provided to permit the removal of this agglomerated mass.

For distilling, evaporating or removing the separating agent from the agglomerated material, various forms of apparatus may be employed, but if it is desirable to distill the hydrocarbon separating agent the material is placed in a suitable retort, or the agglomerated mass may first be thinned with additional hydrocarbon liquid and then commingled with gas or air and fed through a continuous retort 45. If this latter step is followed, the thinned carbonaceous material is introduced to a feed hopper 46, in communication with a coiled treating pipe 47 extending through the retort 45 and subjected to the heat within the retort produced by the burning of a combustible mixture conveyed to the retort by the feed pipe 48. Volatilization of the liquid treating agent and the volatile constituents of the solid particles carried in suspension in the air or gas current will take place, and the solid particles may be separated from the volatile content by introduction to a settling chamber 49 in communication with the coil 47. The material is carried through the retort by the air or fluid current produced by the pump 50, and it will be understood that where the carbonaceous particles contain volatile constituents these volatile substances are removed during the distillation process leaving the solid matter in the form of particles. If the material is free-flowing it is passed through the pump. The step of distillation per se is described and claimed in my co-pending application Serial No. 325,632, filed September 23, 1919.

I have found that finer ash particles incorporated in the carbonaceous substances introduced to the retort may be liberated therefrom, if such particles are heated with sufficient rapidity so that the volatile matter of the solid particles may pass off with explosive violence thereby effecting a further subdivision of the particles and a liberation of some exceedingly fine ash. This finer separation can also be effected if the carbon particles after a heat treatment are passed through a zone of lower pressure so as to produce the explosive violence. The finer particles of ash liberated in this manner may be removed from the carbonaceous content by repeating the separating process hereinbefore described producing a product having a still higher degree of purity. The distilled substances removed from the treating agent and the coal particles if collected in the dry collecting or settling chamber 49 pass out through a pipe 51 to a point of recovery while of course the solid carbon particles are withdrawn in a dry state from the settling chamber. However, if desirable by manipulating the valves 52 and 53 the volatile constituents and the carbon particles may be introduced to a wet collecting receptacle 54 receiving water from a feed pipe 55 which will result in a condensation of the distilled vapors and a mass of oil, water, carbon particles, and separated fine impurities will accumulate in this receptacle. An agitation of the mass drawn from this receptacle will of course result in an agglomeration of the carbon particles and the condensed oils and an expulsion of the non-carbonaceous particles suspended in the water, after which the agglomerated mass can be again distilled to remove the hydrocarbon liquid if the carbon particles are to be used in a dry form.

I have found that certain materials such as lignites, which in their natural state are high in water content, may be treated by my process to remove the water as well as the ash. This also applies to other carbonaceous materials where it is desirable to eliminate water and agglomerate the carbonaceous substances. I have found, however, that the ash content of many lignites and some coals occurs in very minute sizes, so fine in fact that reduction to the finest degree under economical conditions does not satisfactorily free the same, and in such cases it is preferable to reduce these materials by grinding and then subject the same to a heat treatment that causes a further reduction in size of the material and a consequent additional release of ash as hereinabove described, before finally separating the carbonaceous content from the ash. This heat treatment volatilizes part, or all of the oils of the material which may be condensed and employed as an agent for collecting carbonaceous material.

In the treatment of certain other fuels such as anthracite coal I have found that separation is facilitated by mixing with the comminuted material a small percentage of comminuted bituminous coal. I do not fully understand the reason for the improved reaction and the addition of bituminous coal is not absolutely essential as good results have been obtained where the anthracite is treated without such addition.

Having thus described the invention, what I claim is:

1. The process of treating coal containing a carbonaceous fuel content and non-carbonaceous matter, which consists in reducing the coal to a degree of fineness sufficient to detach a substantial portion of the non-carbonaceous matter from the carbonaceous fuel content, in treating the finely divided materials, while wet with an aqueous material, with an agent having an affinity for the carbonaceous fuel material, said agent being of sufficient quantity to form with the carbonaceous fuel matter a non-fluid amalgam consisting principally of the agent and the carbonaceous fuel matter, in separating the amalgam from aqueous material and non-carbonaceous matter originally associated with the coal, and in subjecting the amalgam to distillation to remove the agent and the by-product oils of the carbonaceous fuel, and in collecting the carbonized residue.

2. A process for treating a mineral mixture containing a substantial percentage of carbonaceous fuel matter and associated gangue which comprises reducing the gangue to a sufficient degree of fineness, physically to detach a substantial proportion of the gangue from the carbonaceous fuel matter, in treating the aggregate while wet with an aqueous liquid with an oil, said oil being in sufficient quantity to form with the carbonaceous fuel matter a non-flowing amalgam, in separating such amalgam from the aqueous material and gangue associated therewith, and in subjecting the amalgam to distillation to remove the treating oils and the by-product oils of the coal, and in recovering a residue consisting principally of carbon.

3. The process of treating coal containing a carbonaceous fuel content and non-carbonaceous matter, which consists in reducing the coal to a sufficient degree of fineness physically to detach a substantial portion of the non-carbonaceous matter from the carbonaceous fuel content, and in then treating the finely divided material, while wet with an aqueous liquid, with an oil having an affinity for the carbonaceous fuel matter to form therewith a substantially non-aqueous amalgam, in separating such amalgam from aqueous material, and non-carbonaceous matter, and in then subjecting the amalgam to distillation to remove oil and recover a carbonized residue.

4. The process of treating a mineral containing a carbonaceous fuel content and gangue, which comprises reducing the mineral to a fineness sufficient to physically detach a substantial portion of the non-carbonaceous matter from the carbonaceous fuel, in then treating the finely divided material while wet with an agent having an affinity for the carbonaceous fuel matter to form therewith an amalgam, in separating the amalgam from water and non-carbonaceous matter, and in subjecting the amalgam to distillation to remove oil and recover a carbonized residue.

In testimony whereof I affix my signature.

WALTER E. TRENT.